US006948125B2

(12) United States Patent
Detweiler et al.

(10) Patent No.: US 6,948,125 B2
(45) Date of Patent: Sep. 20, 2005

(54) COMPUTER CONTROLLED USER INTERACTIVE DISPLAY INTERFACE IMPLEMENTATION FOR TRACKING THE ORGANIZATION OF ITEMS IN A HIERARCHICAL TREE OF NESTED CATEGORIES

(75) Inventors: Keely RaNae Detweiler, Austin, TX (US); Mark Hersey, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 544 days.

(21) Appl. No.: 10/132,341

(22) Filed: Apr. 25, 2002

(65) Prior Publication Data

US 2003/0202019 A1 Oct. 30, 2003

(51) Int. Cl.⁷ .............................................. G06F 9/00
(52) U.S. Cl. ........................................ 715/713; 715/854
(58) Field of Search ................................ 715/853, 713, 715/864, 854, 855, 784

(56) References Cited

U.S. PATENT DOCUMENTS

| | | | |
|---|---|---|---|
| 5,065,347 A | 11/1991 | Pajak et al. ................. 395/159 |
| 5,491,795 A | 2/1996 | Beaudet et al. ............. 395/159 |
| 5,644,736 A | 7/1997 | Healy et al. ................ 395/341 |
| 5,644,739 A | 7/1997 | Moursund .................... 395/354 |
| 5,659,791 A | 8/1997 | Nakajima et al. ........... 395/802 |
| 5,701,137 A | 12/1997 | Kiernan et al. ............. 345/119 |
| 5,714,971 A | 2/1998 | Shalit et al. ................ 345/119 |
| 5,724,506 A | 3/1998 | Cleron et al. ........... 395/200.01 |
| 5,731,814 A | 3/1998 | Bala ........................... 345/356 |
| 5,835,091 A | 11/1998 | Bailey et al. ............... 345/345 |
| 5,923,328 A | 7/1999 | Griesmer .................... 345/357 |
| 6,249,284 B1 | 6/2001 | Bogdan ...................... 345/357 |
| 6,271,846 B1 | 8/2001 | Martinez et al. ........... 345/357 |
| 6,300,967 B1 * | 10/2001 | Wagner et al. ............. 715/784 |
| 6,448,985 B1 * | 9/2002 | McNally .................... 715/784 |
| 6,803,930 B1 * | 10/2004 | Simonson .................. 715/784 |

* cited by examiner

*Primary Examiner*—John Cabeca
*Assistant Examiner*—Dennis G. Bonshock
(74) *Attorney, Agent, or Firm*—Jerry Kraft; Mark Walker; Cynthia S. Byrd

(57) ABSTRACT

The implementation of the invention involves a conventional display window and a system for displaying a portion of said hierarchical tree within the borders of the window in combination with an implementation enabling a user to expand each nested displayed category into a displayed list of items in said category, and to collapse said displayed list back to each displayed category. There are means for scrolling said displayed hierarchy through said window. This invention provides for a set of displayed indicators, each representing a hidden expanded category in the hierarchical chain of a list of items displayed within said window. There is a further implementation associated with each displayed indicator enabling a user to select the indicator to collapse the hidden category represented by said indicator and thereby enable the display of the collapsed category within said window.

12 Claims, 7 Drawing Sheets

COMPUTER CONTROLLED USER INTERACTIVE DISPLAY INTERFACE IMPLEMENTATION FOR TRACKING THE ORGANIZATION OF ITEMS IN A HIERARCHICAL TREE OF NESTED CATEGORIES

TECHNICAL FIELD

The present invention relates to user-friendly interactive computer supported display technology and, particularly, to such user interactive systems and programs that have user interactive interfaces with tree hierarchies of categories or classes of items or objects.

BACKGROUND OF RELATED ART

The computer and computer related industries have benefitted from a rapidly increasing availability of data processing functions. Along with this benefit comes the problem of how to present the great number and variety of available functions to the interactive operator or user in display interfaces that are relatively easy to use. In recent years, the hierarchal tree has been a widely used expedient for helping the user to keep track of and organize the operative and available functions. In typical tree structures, such as those in Microsoft Windows 2000™ and IBM Lotus™ systems, there is presented on the display screen a variety of operating and available functions and resources in tree hierarchies with classes and subclasses, or categories and lower categories of functions and resources displayed as objects or items at nodes in a descending and widening order based upon some kind of derivation from the next higher class or category. In conventional tree displays, as in the Lotus systems, it is customary to refer to categories in the hierarchical tree as being either in an expanded or collapsed state, i.e. an expanded or collapsed category. When a category is collapsed, it is at the lowest level of its particular hierarchical chain in the displayed tree. On the other hand, when a category is expanded, it is expanded into a list or set of displayed next lower level items, which, in turn, may respectively be the lowest level items in the tree or such items may also be collapsed but expandable categories. Such hierarchical trees of collapsed and expandable categories are considered in detail in the text, *Lotus Notes 4 Plain and Simple*, Rupert Clayton, published 1996, by Sybex Inc., Alameda, Calif., and particularly at pp. 235 through 236 and 144 through 146. Other systems may use other names to describe the order of classes and items in the hierarchical tree, such as classes and subclasses or parent and child elements, objects or items, but the processes and attendant problems in interfacing with such trees, which will be considered in the invention, will be similar. In the Lotus system, a variable symbol called a "Twistie" is used to designate whether a particular category or class is expanded. The Twistie symbol is a small triangle or arrowhead. When the Twistie is pointing horizontally, then its associated category is collapsed i.e. unexpanded. When the Twistie is pointing down, then the category is expanded to the list of items extending downward from the expanded category. Twisties are described in the above-referenced *Lotus Notes 4 Plain and Simple* text at po, 135 and 144. While the Twistie will be used in subsequently described embodiments of this invention, it should be noted that other expedients are used in this technology to designate an expanded category, e.g. highlighting or underlining.

With the many expanded functions handled through conventional computer desktop Graphical User Interfaces (GUIs), the windows through which the user may access and display the hierarchical tree of categories is often quite small. However, even if the user can conveniently expand the window to the full screen, a great many hierarchical trees are so extensive that the full tree is rarely completely displayable. This is particularly true with the smaller notebook and palm-type personal digital assistant computer displays.

Thus, windows in which only a small portion of the hierarchical tree is visible present problems to users. One significant problem is that the expanded categories that are hidden or no longer visible within the window because of the expansion to an extensive list of items and/or general user scrolling. When a user is relating to and considering alternatives for a particular item of interest, it is often important for the user to have a sense or a view of the hierarchical chain of an item or a list of items resulting from an expansion of a category. By hierarchical chain is meant the visualization of the links or category nodes back to a highest order or root category.

Currently, this may require a great amount of scrolling back and forth within the window to orient the user seeking hidden expanded categories and relating such categories to the listed items of interest. Such scrolling within small windows is particularly difficult and frustrating to users with physical and visual limitations.

SUMMARY OF THE PRESENT INVENTION

The present invention provides a user friendly display interface that facilitates the locating and processing of expanded categories in a hierarchical tree hidden outside of the display window.

The implementation of the invention involves a conventional display window and means for displaying a portion of said hierarchical tree within the borders of the window in combination with means enabling a user to expand each nested displayed category into a displayed list of items in said category, and to collapse said displayed list back to each displayed category. There are means for scrolling said displayed hierarchy through said window. This invention provides for a set of displayed indicators, each representing a hidden expanded category in the hierarchical chain of a list of items displayed within said window. There are further means associated with each displayed indicator enabling a user to select the indicator to collapse the hidden category represented by said indicator and thereby enable the display of the collapsed category within said window.

In accordance with an important aspect of the invention, there is provided means for automatically displaying an indicator representing a hidden expanded category whenever a displayed expanded category in said hierarchical chain is scrolled out of said window, as well as means for automatically removing an indicator representing a hidden expanded category whenever said hidden category is redisplayed in said window.

The invention may effectively be used in a system where each of the nested categories in said displayed hierarchy have associated twistie symbols, wherein a twistie pointing in a first direction indicates the category is expanded and a twistie pointing in a second direction indicates that the category is collapsed. In such an application, each twistie has associated therewith means enabling a user to point the twistie in the first and second directions to thereby expand and collapse the category associated with the twistie whereby the displayed indicators in said set function as surrogate twisties for the represented hidden categories.

BRIEF DESCRIPTION OF THE DRAWINGS

The present invention will be better understood and its numerous objects and advantages will become more apparent to those skilled in the art by reference to the following drawings, in conjunction with the accompanying specification, in which.

DETAILED DESCRIPTION OF THE PREFERRED EMBODIMENT

Figure 1:
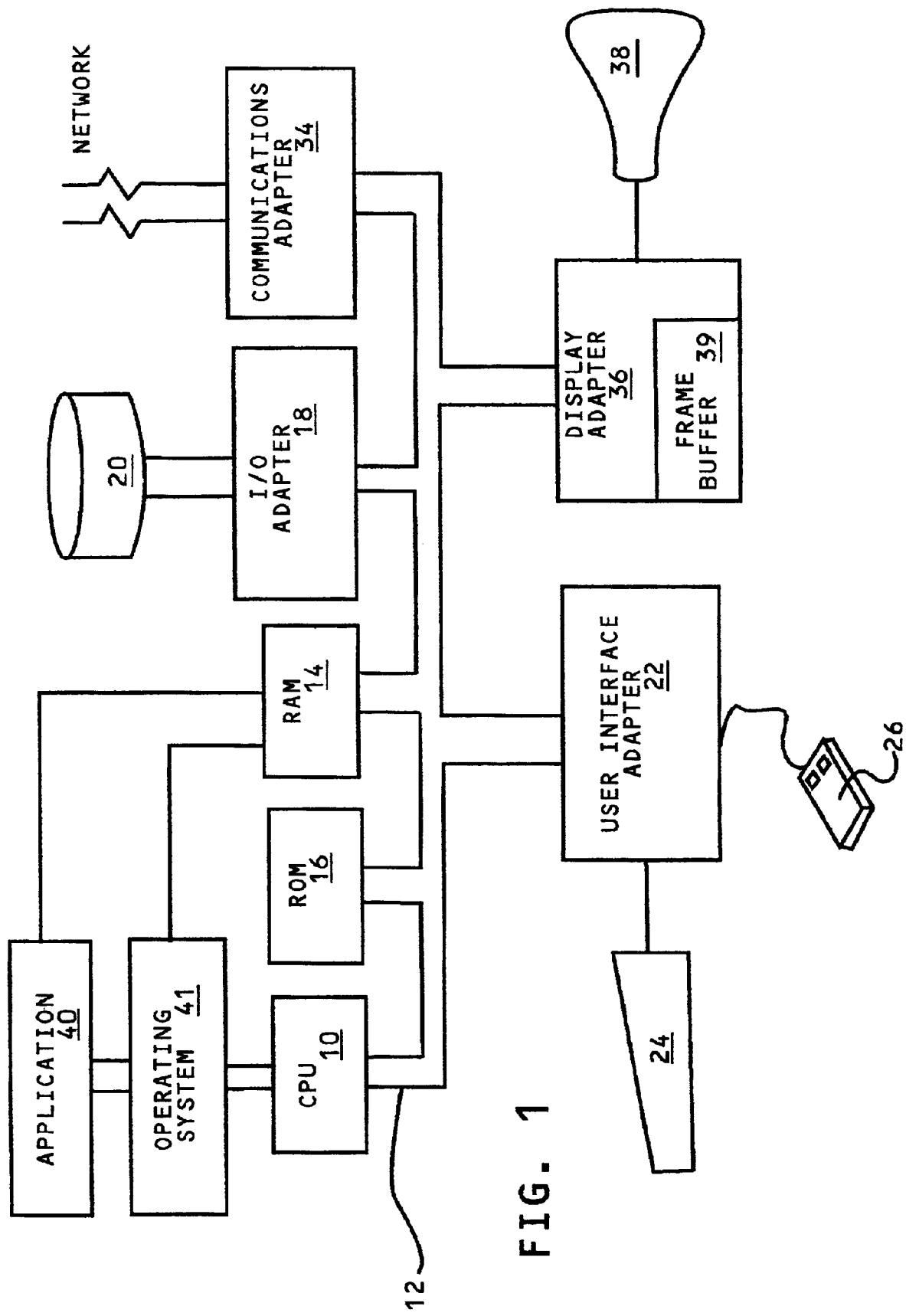
FIG. 1 is a block diagram of an interactive data processor controlled display system including a central processing unit that is capable of implementing the present invention of tracking hidden expanded categories in a hierarchical tree of which only a portion is displayed in a window.

Referring to FIG. 1, a typical generalized data processing system display terminal is shown which may function as the computer controlled display terminal used for tracking hidden expanded categories in a hierarchical tree of which only a portion is displayed in a window. A central processing unit (CPU) 10, such as any PC microprocessor in a PC available from International Business Machines Corporation (IBM) or Dell Corp., is provided and interconnected to various other components by system bus 12. An operating system 41 runs on CPU 10, provides control and is used to coordinate the function of the various components of FIG. 1. Operating system 41 may be one of the commercially available operating systems, such as Microsoft's Windows98™ or WindowsNT™, as well as the UNIX or AIX operating systems. An application program that includes routines for tracking hidden expanded categories in a hierarchical tree of which only a portion is displayed in a window, to be subsequently described in detail, runs in conjunction with operating system 41 and provides output calls to the operating system 41 that, in turn, implements the various functions to be performed by the application 40. A Read Only Memory (ROM) 16 is connected to CPU 10 via bus 12 and includes the Basic Input/Output System (BIOS) that controls the basic computer functions. Random Access Memory (RAM) 14, I/O adapter 18 and communications adapter 34 are also interconnected to system bus 12. It should be noted that software components, including operating system 41 and application 40, are loaded into RAM 14, which is the computer system's main memory. I/O adapter 18 may be a Small Computer System Interface (SCSI) adapter that communicates with the disk storage device 20, i.e. a hard drive. Communications adapter 34 interconnects bus 12 with an outside network enabling the data processing system to communicate with other such systems over a Local Area Network (LAN) or a Wide Area Network (WAN), which includes, of course, the Internet or World Wide Web (Web). I/O devices are also connected to system bus 12 via user interface adapter 22 and display adapter 36. Keyboard 24 and mouse 26 are all interconnected to bus 12 through user interface adapter 22. Mouse 26 operates in a conventional manner insofar as user movement is concerned. Display adapter 36 includes a frame buffer 39, which is a storage device that holds a representation of each pixel on the display screen 38. Images may be stored in frame buffer 39 for display on monitor 38 through various components, such as a digital to analog converter (not shown) and the like. By using the aforementioned mouse or related devices, a user is capable of inputting information to the system through the keyboard 24 or mouse 26 and receiving output information from the system via display 38.

Figure 2:
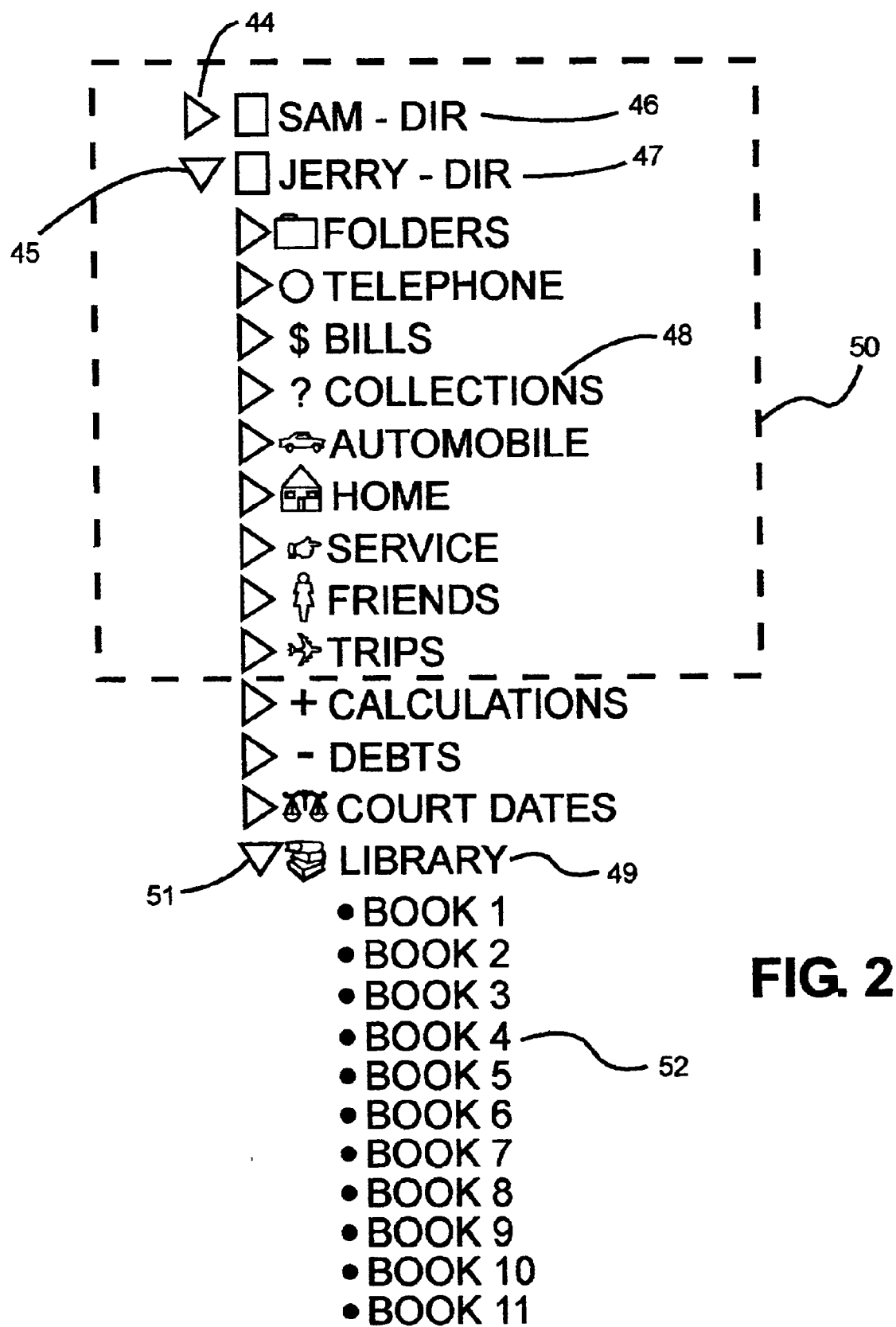
FIG. 2 is a diagrammatic display of part of a hierarchical tree of which only a portion can be displayed in the outline of the window shown.

Now, with reference to FIG. 2, a section of a hierarchical tree that is to be displayable is shown. However, the window within which the tree may be displayed is limited by its dimensions as indicated by the window dashed line border 50. There are two categories 46 and 47 at the highest level in this section. Category 46 is collapsed as indicated by its twistie 44 being horizontal. Category 47 is expanded (as indicated by its downward twistie 45) into a list 48 of items that are, in turn, collapsed lower level categories as indicated by all of their respective twisties being horizontal. The exception on this list is category 49 which is expanded (as indicated by its downward twistie 51) into list of items 52.

Figure 3:
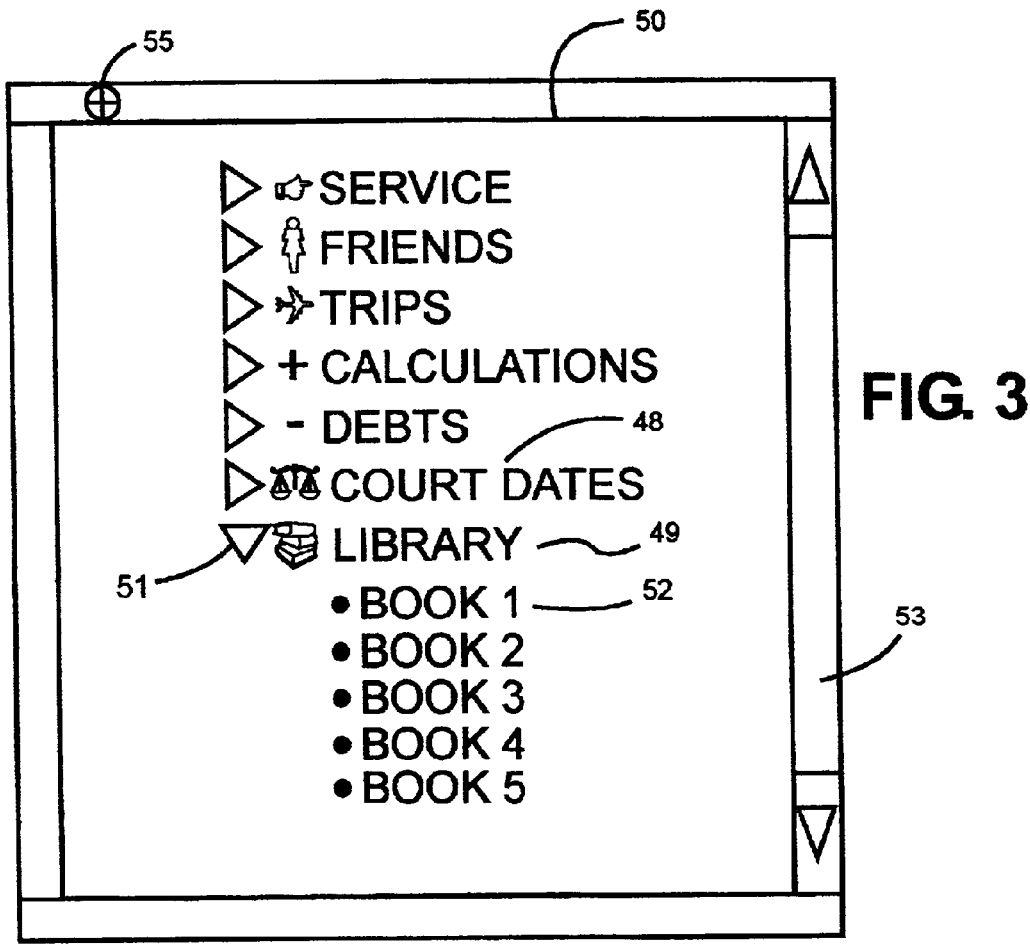
FIG. 3 is a diagrammatic starting view of a display screen to illustrate a window with only a portion of a hierarchical tree visible and a hidden expanded category.
Figure 4:
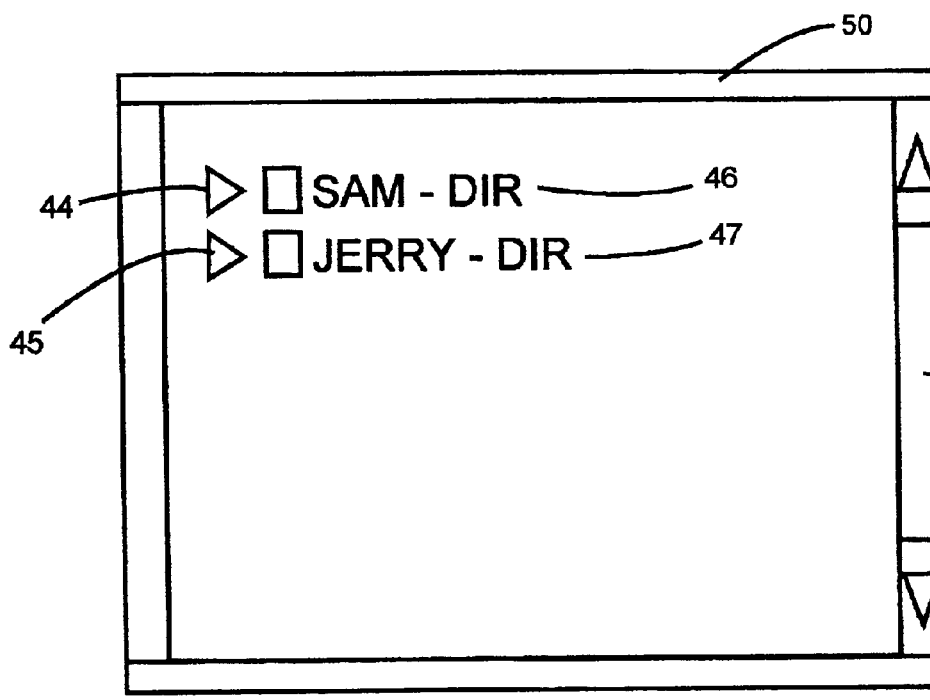
FIG. 4 is the diagrammatic view of FIG. 3 after the initially hidden expanded category has been collapsed in accordance with the invention, and is now visible.

Assume now that the window 50 is scrolled to the position shown in FIG. 3 as a result of scrolling with scroll bar 53. As a result, both categories 46 and 47 have become hidden. Category 46 is of less concern because it is collapsed and, thus, not part of the hierarchical chain of any of the items displayed in the window. Category 47, on the other hand, is significant because it is expanded and, consequently, part of the hierarchical chain of items 52 displayed in the window. In order to track hidden expanded category 47, as soon as the category was scrolled out of the limits of window 50 and became hidden, an indicator 55 representing expanded category 47 was automatically set, preferably vertically aligned in position with hidden twistie 45 for category 47. In effect, indicator 55 becomes a visible surrogate for twistie 45. As noted in the above-described text, *Lotus Notes* 4 *Plain and Simple*, when a visible twistie is selected via mouse and clicked on, it reverses its direction to either collapse or expand the category. If the user clicks on indicator 55, he collapses category 47 which closes list 48 and thereby its subcategory 49 and list 52 to result in the window shown in FIG. 4, showing both categories 46 and 47 in the collapsed states. Since category 47 is no longer hidden, indicator 55 disappears.

It should be noted with respect to FIG. 3 that, in the case where the user is not familiar with the function of indicator 55, he may be advised via a conventional dialog or instruction box or by a conventional flyover that may appear when he points to indicator 55.

Figure 5:
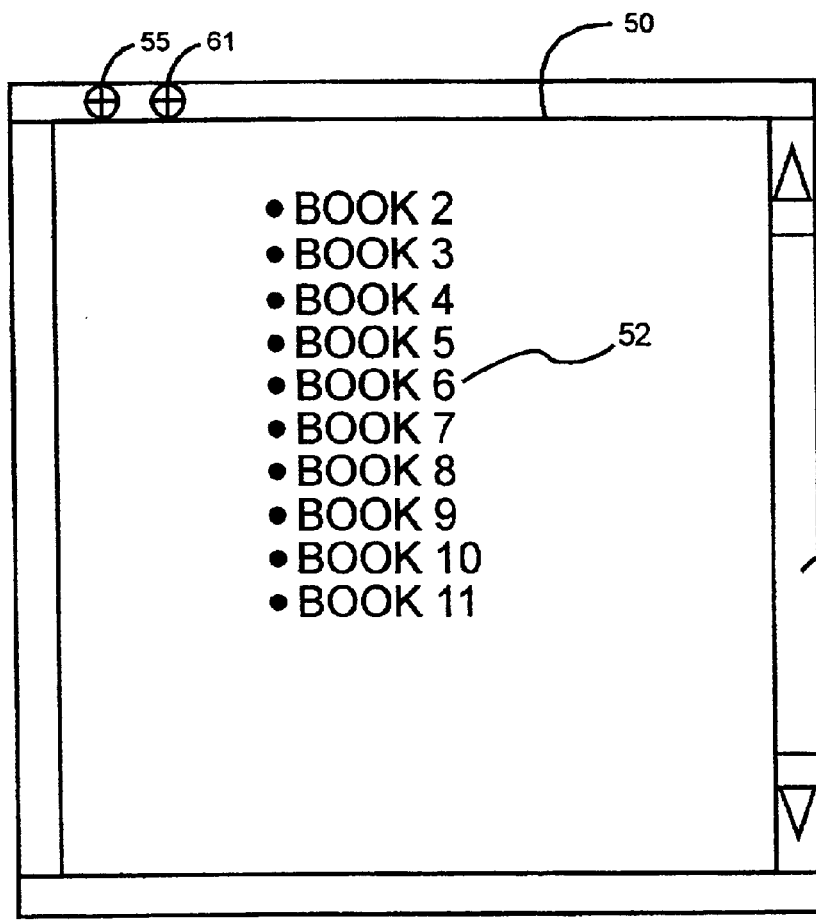
FIG. 5 is a diagrammatic starting view of the display screen of FIG. 3 to illustrate a different window with another portion of the hierarchical tree visible so that there are two hidden expanded categories.
Figure 6:
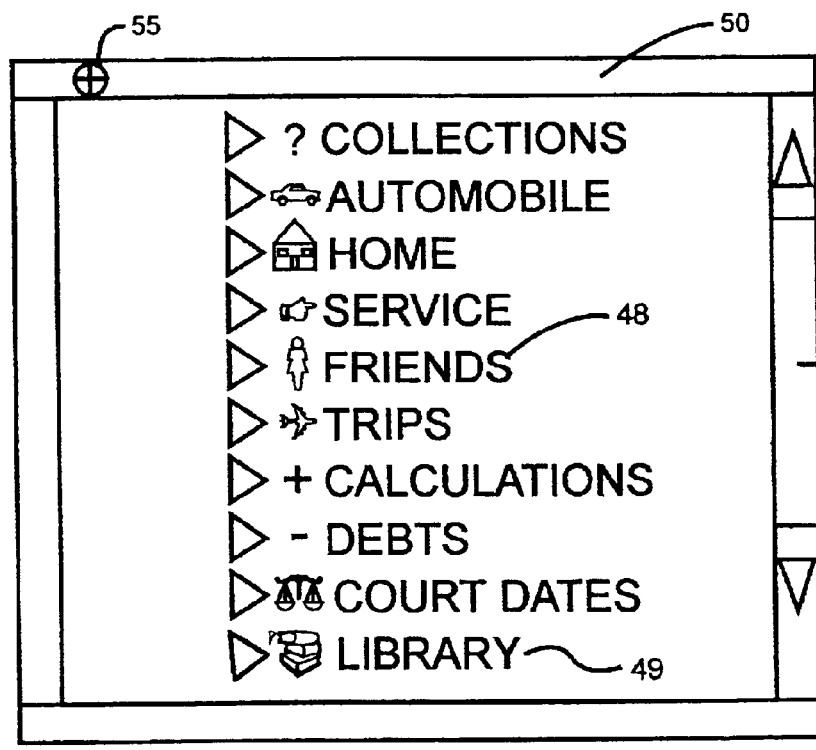
FIG. 6 is the diagrammatic view of FIG. 5 after one of the initially hidden expanded categories has been collapsed in accordance with the invention, and is now visible.

In FIG. 5, the window 50 has been scrolled further down so that both expanded categories 47 and 49 have become hidden, and, thus, respectively represented by indicators 55 and 61. In this example, the user, as shown in FIG. 6, goes on to select indicator 61 to thereby collapse category 49 that is then part of displayed list 48 of collapsed categories visible in the window 50.

Figure 7:
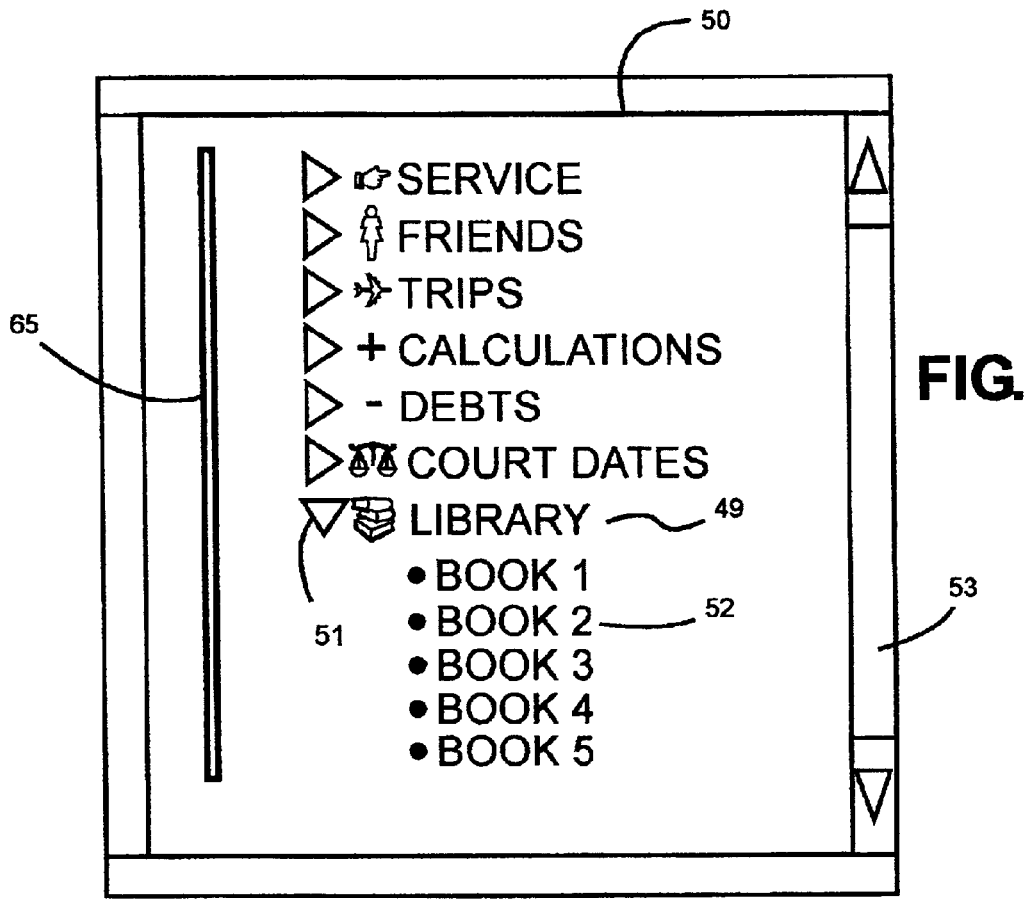
FIG. 7 is the same display view of FIG. 3 with a different indicator representing the hidden expanded category.
Figure 8:
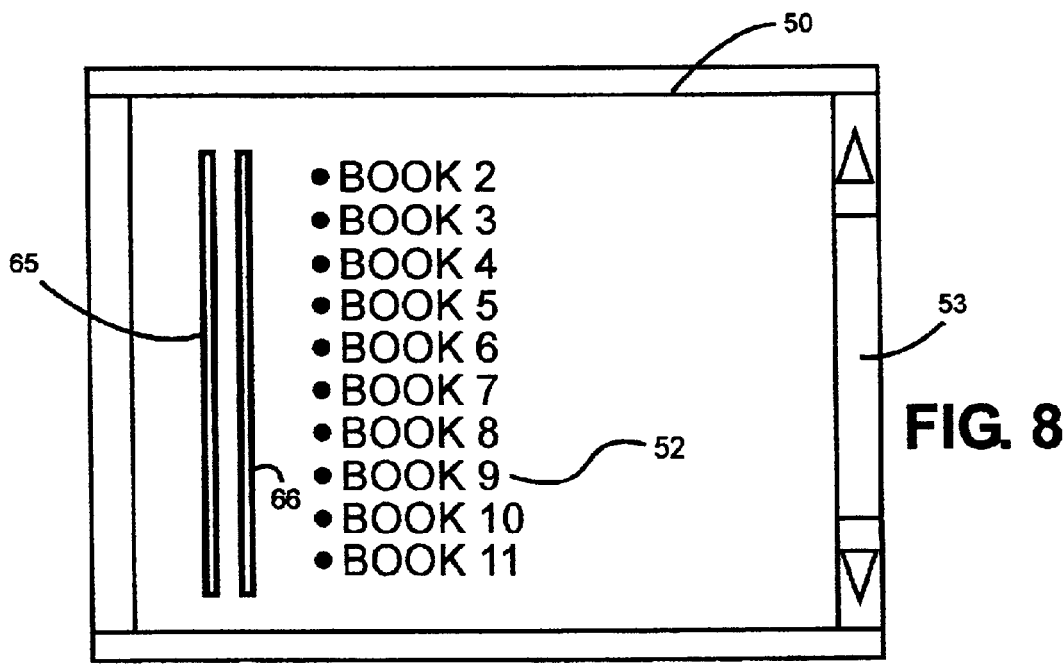
FIG. 8 is the same display view of FIG. 5 with different indicators representing the hidden expanded categories.

The indicator representative of a hidden expanded category may be a vertical bar. Thus, FIG. 7 is the window state of FIG. 3 except that bar 65 instead of indicator 55 represents hidden expanded category 47. Similarly, FIG. 8 is the window state of FIG. 5 except that bars 65 and 66 instead of indicators 55 and 61 respectively represent hidden expanded categories 47 and 49. Bars 65 and 66, like indicators 55 and 61, may appear when their associated expanded categories 47 and 49 become hidden and disappear when their categories are either collapsed or reappear in the window. The bars 65 and 66, like indicators 55 and 61, may, of course, function to be clicked upon to respectively collapse the hidden categories that they represent. Since the bars would be "hot", i.e. selectable, throughout their lengths, they would be easier to click on than the button indicators 55 and 61 by users with physical limitations. Alternatively, the bars could be present continuously irrespective of whether their associated expanded categories were hidden. In such a case, the bars would only become "hot", i.e. selectable, to collapse the expanded category when their associated expanded category became hidden.

Figure 9:
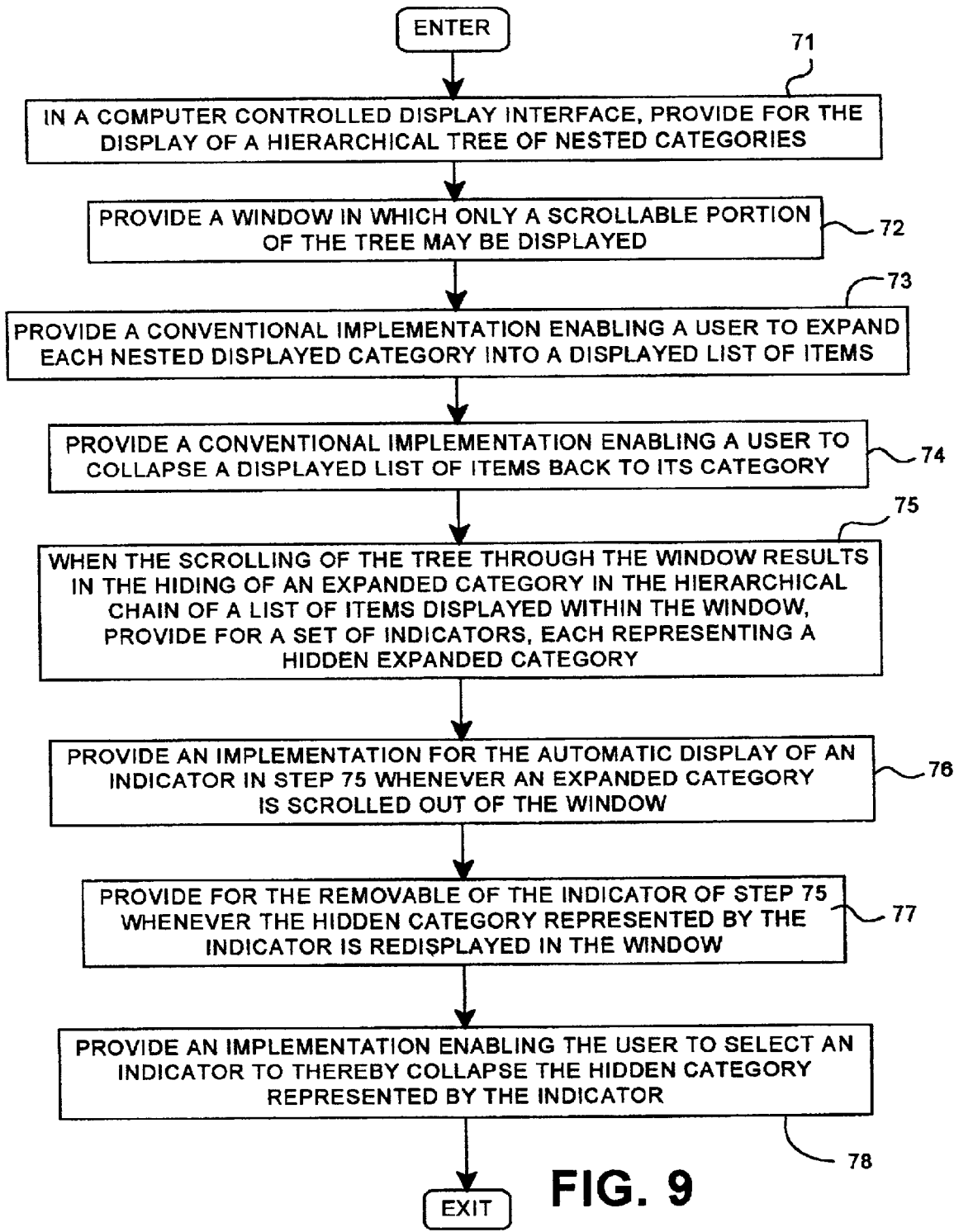
FIG. 9 is a general flowchart of a program set up to implement the present invention for tracking hidden expanded categories in a hierarchical tree of which only a portion is displayed in a window.
Figure 10:
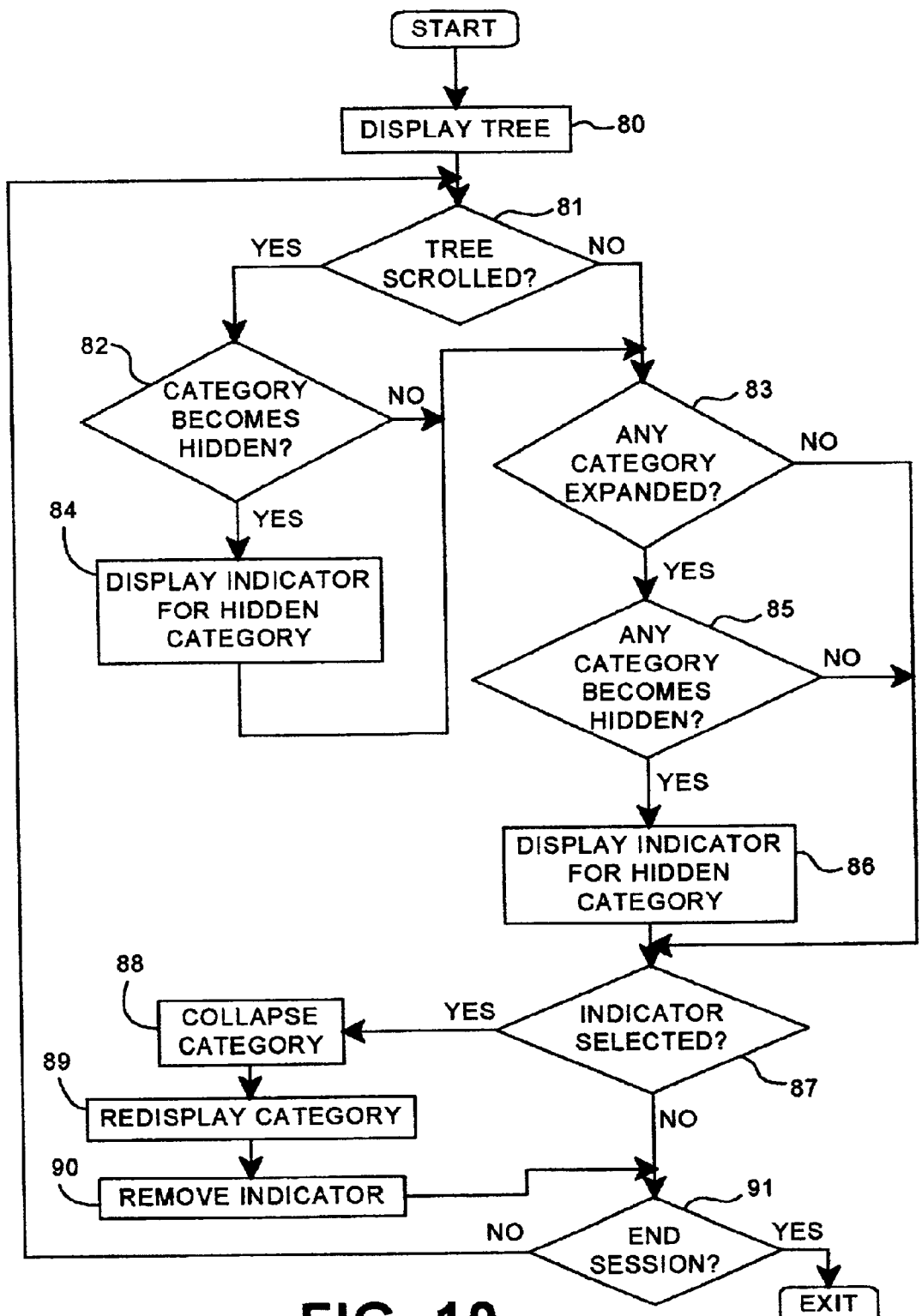
FIG. 10 is a flowchart of an illustrative run of a program set up in accordance with the flowchart of FIG. 9.

Now, with reference to FIGS. 9 and 10, we will describe a process implemented by the present invention in conjunction with the flowcharts of these figures. FIG. 9 is a flowchart showing the development of a process according to the present invention for keeping track of hidden expanded categories in a hierarchical tree, only a portion of which can be displayed in a window. A system is provided for the display of a portion of a hierarchical tree of nested categories, step 71, in a GUI display interface scrollable window within which only a portion of the tree may be displayed, step 72. A conventional implementation is provided enabling a user to expand each nested category into a displayable list of items, step 73. Also, a like conventional implementation is provided enabling a user to collapse each displayable list of items back into its category, step 74. There is an implementation resulting when the scrolling of the tree through the window results in the hiding of an expanded category in the hierarchical chain of items currently displayed within the window tree. A set of one or more indicators is provided, each representing a hidden expanded category, step 75. A further implementation is provided for the automatic display of an appropriate indicator in step 75 whenever an expanded category is scrolled out of the window, step 76. Similarly, an implementation is provided for the automatic removal of an appropriate indicator in step 75 whenever a hidden expanded category is returned into the window, step 77. Finally, there is provided an implementation enabling the user to select or click on an indicator to thereby collapse the hidden category represented by the indicator, step 78.

An illustrative run of the process set up in FIG. 9 will now be described with respect to FIG. 10. First, step 80, a suitable portion of the tree is displayed within the window. A determination is then made as to whether the tree is then scrolled, step 81. If Yes, a further determination is made as to whether any expanded category has been hidden, step 82. If Yes, then an indicator representing the hidden category is displayed, step 84. Then, or if the determination in either steps 81 or 82 had been No, a determination is made as to whether any category has been expanded, step 83. If Yes, then a further determination is made as to whether any expanded category has become hidden, step 85. Then, if Yes, an indicator for the hidden expanded category is displayed, step 86. Then, or if the determination in steps 83 or 85 had been No, a determination is made as to whether any indicator representing a hidden expanded category has been selected, step 87. If Yes, then, the represented category is collapsed, step 88; the category is appropriately redisplayed in the window, step 89; and the indicator is removed, step 90. At this stage, or if the determination from step 87 had been No, a determination may appropriately be made as to whether the session is at an end, step 91. If Yes, the session is exited. If No, the process is returned to step 81 where further scrolling of the displayed tree is awaited.

One of the implementations of the present invention is as an application program 40 made up of programming steps or instructions resident in RAM 14, FIG. 1, during computer operations. Until required by the computer system, the program instructions may be stored in another readable medium, e.g. in disk drive 20 or in a removable memory such as an optical disk for use in a CD ROM computer input or in a floppy disk for use in a floppy disk drive computer input. Further, the program instructions may be stored in the memory of another computer prior to use in the system of the present invention and transmitted over a LAN or a WAN, such as the Internet, when required by the user of the present invention. One skilled in the art should appreciate that the processes controlling the present invention are capable of being distributed in the form of computer readable media of a variety of forms.

Although certain preferred embodiments have been shown and described, it will be understood that many changes and modifications may be made therein without departing from the scope and intent of the appended claims.

What is claimed is:

1. In a computer controlled user interactive display system, a display interface implementation for tracking the organization of items in a hierarchy of nested categories comprising:

means for displaying a window;

means for displaying a portion of said hierarchy within the borders of said window;

means enabling a user to expand each nested displayed category into a displayed list of items in said category, and to collapse said displayed list back to each displayed category;

means for scrolling said displayed hierarchy through said window; and a set of displayed indicators, each representing a hidden completely expanded category in the hierarchical chain of a list of items displayed within said window;

further including means associated with each displayed indicator enabling a user to select said indicator to collapse the hidden category represented by said indicator and thereby enable the display of the collapsed category within said window;

wherein each of the nested categories in said displayed hierarchy have associated twistie symbols wherein a twistie pointing in a first direction indicates the category is expanded and a twistie pointing in a second direction indicates that the category is collapsed.

2. The display interface implementation of claim 1 wherein each twistie has associated therewith means enabling a user to point the twistie in said first and second directions to thereby expand and collapse the category associated with the twistie whereby the displayed indicators in said set function as surrogate twisties for the represented hidden categories.

3. The display interface implementation of claim 1 further including means for automatically displaying an indicator representing a hidden expanded category whenever a displayed expanded category in said hierarchical chain is strolled out of said window.

4. The display interface implementation of claim 3 further including means for automatically removing an indicator representing a hidden expanded category whenever said hidden category is redisplayed in said window.

5. A method for tracking the organization of items in a hierarchy of nested categories on a computer controlled user interactive display interface comprising:

defining a window on said display interface;

displaying a portion of said hierarchy within the borders of said window;

enabling a user to expand each nested displayed category into a displayed list of items in said category, and to collapse said displayed list back to each displayed category;

scrolling said displayed hierarchy through said window; and displaying a set of indicators, each representing a hidden completely expanded category in the hierarchical chain of a list of items displayed within said window;

further including the step of enabling a user to select each indicator to collapse the hidden category represented by said indicator and thereby enable the display of the collapsed category within said window;

wherein each of the nested categories in said displayed hierarchy have associated twistie symbols wherein a twistie pointing in a first direction indicates the category is expanded and a twistie pointing in a second direction indicates that the category is collapsed.

6. The method of claim 5 further including the step of enabling a user to point the twistie in said first and second directions to thereby expand and collapse the category associated with the twistie whereby the displayed indicators in said set function as surrogate twisties for the represented hidden categories.

7. The method of claim 5 further including the step of automatically displaying an indicator representing a hidden expanded category whenever a displayed expanded category in said hierarchical chain is scrolled out of said window.

8. The method of claim 7 further including the step of automatically removing an indicator representing a hidden expanded category whenever said hidden category is redisplayed in said window.

9. A computer program having program code included on a computer readable medium for tracking the organization of items in a hierarchy of nested categories on a computer controlled user interactive display system interface comprising:

means for displaying a window;

means for displaying a portion of said hierarchy within the borders of said window;

means enabling a user to expand each nested displayed category into a displayed list of items in said category, and to collapse said displayed list back to each displayed category;

means for scrolling said displayed hierarchy through said window; and a set of displayed indicators, each representing a hidden completely expanded category in the hierarchical chain of a list of items displayed within said window;

further including means associated with each displayed indicator enabling a user to select said indicator to collapse the hidden category represented by said indicator and thereby enable the display of the collapsed category within said window;

wherein each of the nested categories in said displayed hierarchy have associated twistie symbols wherein a twistie pointing in a first direction indicates the category is expanded and a twistie pointing in a second direction indicates that the category is collapsed.

10. The computer program of claim 9 wherein each twistie has associated therewith means enabling a user to point the twistie in said first and second directions to thereby expand and collapse the category associated with the twistie whereby the displayed indicators in said set function as surrogate twisties for the represented hidden categories.

11. The computer program of claim 9 further including means for automatically displaying an indicator representing a hidden expanded category whenever a displayed expanded category in said hierarchical chain is scrolled out of said window.

12. The computer program of claim 11 further including means for automatically removing an indicator representing a hidden expended category whenever said hidden category is redisplayed in said window.

* * * * *